Jan. 31, 1961 H. R. HEULER 2,969,900
ARTICLE SUPPORT TO SPAN HUMP IN AN AUTOMOBILE FLOOR
Filed Feb. 26, 1959

INVENTOR.
HARRY R. HEULER
BY Marvin B. Davis
ATTORNEY

United States Patent Office 2,969,900
Patented Jan. 31, 1961

---

2,969,900

ARTICLE SUPPORT TO SPAN HUMP IN AN AUTOMOBILE FLOOR

Harry R. Heuler, 2906 E. 18th St., Raytown, Mo.

Filed Feb. 26, 1959, Ser. No. 795,777

2 Claims. (Cl. 224—29)

This invention relates to an improved article support to span the hump or longitudinal raised portion in an automobile floor spaced above the drive shaft of the automobile.

Heretofore supporting plates have been patented to be supported above the hump of an automobile floor.

An object of my invention is to provide an economical support frame for articles made of wire members to span the hump or raised portion in an automobile floor, the support frame having an upper planar face made of wire members disposed in normal horizontal position adapted to be spaced above the hump, the support wire frame members having projected curved portions extended from opposed edges of the planar face to curve downwardly and outwardly over the hump and cling to the junctures of the hump in the floor of an automobile, and the support having well known clips attached to the upper face thereof adapted to receive and hold articles such as bottles and a carton of paper tissues.

This improved invention will be better understood from the accompanying drawing, this specification and the definitions of the appended claims.

Figure 1:
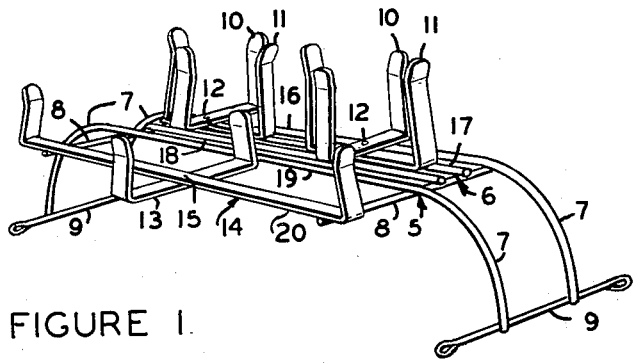
Figure 1 is a perspective view illustrating the improved support frame for articles.
Figure 2:
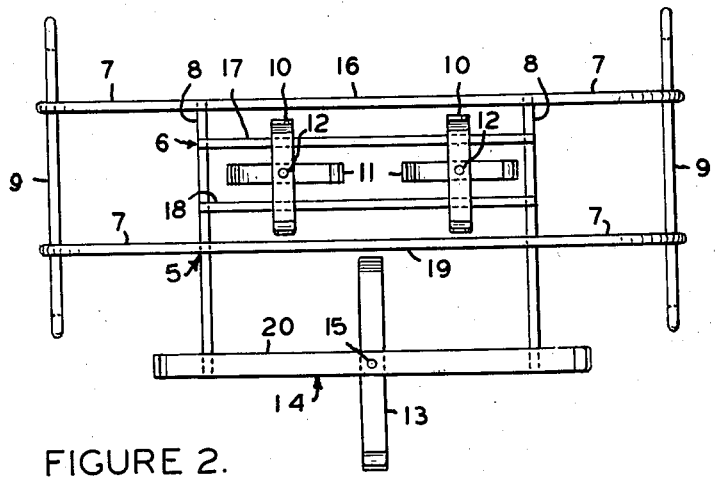
Figure 2 is a plan view illustrating the support frame.
Figure 3:
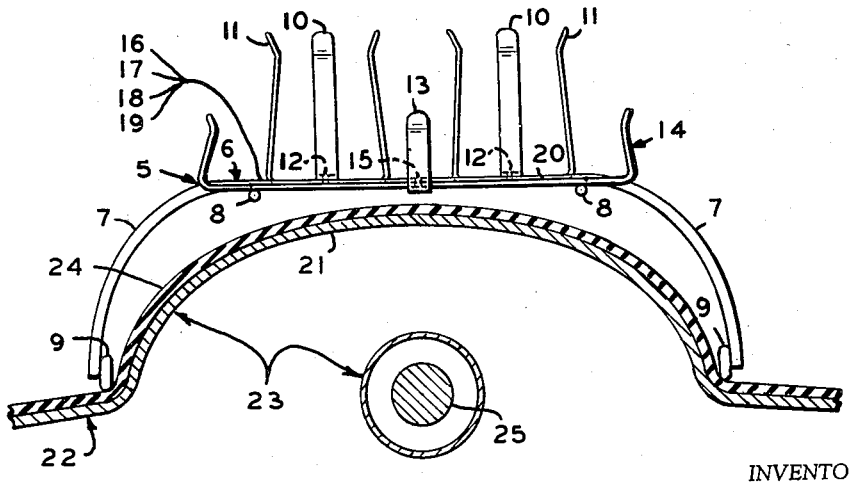
Figure 3 is a longitudinal view in elevation illustrating the support frame spaced above a section of the hump in an automobile and clinging to the sides thereof. A drive shaft is spaced below the hump to illustrate the relative positions therof.

The support frame 5 primarily consists of a frame 6 having a planar upper face normally disposed in a horizontal position and is provided with projected curved portions 7 extended downwardly and outwardly from two opposed edges of the planar upper face to base members 9. Well known bottle clips 10 and 11 are bent to a U shape and located in transverse relative positions with the lower center portions thereof secured together at 12. Carton clips 13 and 14 are bent in a U shape and located in transverse relative positions with the lower center portions thereof secured together at 15. The U shape clips 10 and 14 primarily are secured to the upper face of the frame 6.

The frame 6 comprises longitudinal, spaced, parallel members 16, 17, 18, 19 and 20 secured to transverse edge members 8 located on the lower face thereof.

The base members 9 are spaced, parallel wires disposed transversely to the curved portions 7 and the lower ends of the curved portions 7 are secured to intermediate portions of the base members 9.

The base members 9 are spaced sufficiently to cling to the arched portion 21 by means of an inherent spring action of the support as it is manually pressed over the major portion of the hump or arched portions 21 of the floor 22 of an automobile 23. A floor mat 24 is usually made of rubber or composition material and has a tendency to hold the base members 9 in position.

The hump or arched floor portion 21 is necessary in most automobiles to provide floating action of the drive shaft 25 and is least adapted for foot rest and best adapted for the location of the support for articles for self service of persons located on either side of the arched floor portion 21.

I claim:

1. A support frame comprising: a pair of parallel wire base members spaced sufficiently and adapted to rest at respective base junctures of a hump in the floor of an automobile, a pair of spaced, parallel elongated wire members, said pair of parallel wire base members being located transversely to said pair of parallel elongated wire members, the mid-portions of said pair of parallel elongated wire members being normally horizontal, the end portions of said pair of parallel elongated wire members being gradually curved outwardly and downwardly and secured to respective said wire base members, a pair of parallel cantilever wire members, said pair of parallel cantilever wire members being spaced and secured transversely to the mid-portions of the said pair of parallel elongated wire members, an upwardly opening generally U shaped spring clip, said pair of parallel cantilever wire members being extended outwardly sufficiently from one of said pair of parallel elongated wire members to support said upwardly opening generally U shaped spring clip and being secured thereto, a second upwardly opening generally U shaped spring clip, said second upwardly opening generally U shaped spring clip being located transversely on and secured to said first mentioned upwardly opening generally U shaped spring clip.

2. A support frame as claimed in claim 1, intermediate elongated wire members, said intermediate elongated wire members being parallel to the mid-portions of the parallel elongated wire members and spaced between the horizontal mid-portions of said pair of parallel elongated wire members, the end portions of said intermediate elongated wire members being secured to said pair of parallel cantilever wire members, additional upwardly opening generally U shaped spring clips, and said additional upwardly opening generally U shaped spring clips being secured to said intermediate elongated wire members.

References Cited in the file of this patent

UNITED STATES PATENTS

| | | |
|---|---|---|
| 1,533,857 | Hart | Apr. 14, 1925 |
| 1,744,054 | Mosgrove | Jan. 21, 1930 |
| 2,262,597 | Watral | Nov. 11, 1941 |
| 2,493,170 | Stiff | Jan. 3, 1950 |
| 2,647,716 | Hudziak | Aug. 4, 1953 |
| 2,899,162 | Young | Aug. 11, 1959 |

FOREIGN PATENTS

| | | |
|---|---|---|
| 571,939 | Great Britain | Sept. 14, 1945 |